(12) United States Patent
Østrøm

(10) Patent No.: US 7,270,226 B2
(45) Date of Patent: Sep. 18, 2007

(54) AIRPORT BAGGAGE HANDLING CONVEYOR SYSTEM

(76) Inventor: Ulf Østrøm, Eiriksgt 7., Olso (NO) 0650

(*) Notice: Subject to any disclaimer, the term of this patent is extended or adjusted under 35 U.S.C. 154(b) by 0 days.

(21) Appl. No.: 10/344,344

(22) PCT Filed: Jun. 27, 2001

(86) PCT No.: PCT/NO01/00273

§ 371 (c)(1),
(2), (4) Date: Jul. 7, 2003

(87) PCT Pub. No.: WO02/06141

PCT Pub. Date: Jan. 24, 2002

(65) Prior Publication Data

US 2004/0000463 A1    Jan. 1, 2004

(30) Foreign Application Priority Data

Jul. 6, 2000    (NO)    .................... 20003491

(51) Int. Cl.
*B65G 43/08* (2006.01)
(52) U.S. Cl. .................... 198/358; 198/349; 198/347.4
(58) Field of Classification Search ............. 198/349.4, 198/349, 349.1, 349.6, 358, 349.5, 347.4; 209/559, 917
See application file for complete search history.

(56) References Cited

U.S. PATENT DOCUMENTS

| | | | | |
|---|---|---|---|---|
| 3,153,487 A | * | 10/1964 | Hoellen | ................... 198/347.4 |
| 3,260,349 A | * | 7/1966 | Vander Meer | ............... 198/350 |
| 3,610,159 A | * | 10/1971 | Fickenscher | ................. 198/349 |
| 3,776,395 A | * | 12/1973 | Lingg et al. | ............. 198/465.2 |
| 3,915,284 A | * | 10/1975 | Knockeart et al. | .......... 198/349 |
| 5,056,647 A | * | 10/1991 | Rosenbaum | ............. 198/460.1 |
| 5,413,205 A | * | 5/1995 | Taylor et al. | ................ 198/358 |
| 5,566,834 A | * | 10/1996 | Prydtz et al. | ............ 198/349.1 |
| 5,575,375 A | * | 11/1996 | Sandusky et al. | ........... 198/358 |
| 6,279,721 B1 | | 8/2001 | Lyngso et al. | |
| 6,557,724 B1 | * | 5/2003 | LeCroy et al. | ........... 198/463.3 |
| 6,580,046 B1 | * | 6/2003 | Koini et al. | ................. 209/564 |
| 6,644,458 B1 | * | 11/2003 | Edslev-Christensen | . 198/370.01 |
| 6,789,660 B1 | * | 9/2004 | Bruun et al. | ............. 198/347.1 |

FOREIGN PATENT DOCUMENTS

| | | |
|---|---|---|
| DE | 3836193 | 4/1990 |
| DK | 168040 | 1/1994 |
| JP | 2-265813 | 10/1990 |
| NO | 952305 | 6/1995 |
| WO | WO99/67160 | 12/1999 |

* cited by examiner

*Primary Examiner*—James R. Bidwell
(74) *Attorney, Agent, or Firm*—Nixon & Vanderhye PC

(57) ABSTRACT

A system for handling baggage in airports, where the passenger hands over his baggage on check-in and collects it at the place of arrival. The system includes a check-in area for baggage where main baggage scheduled for a single flight and transit baggage scheduled for multiple flights are sorted and marked. A conveyor is provided for transporting main baggage to a main baggage buffer and for transporting transit baggage to a transit baggage buffer. A conveyor assembly is further provided for the continuous transport of baggage from the main baggage and transit baggage buffers into a cargo compartment in respective planes located in a departure area.

8 Claims, 1 Drawing Sheet

AIRPORT BAGGAGE HANDLING CONVEYOR SYSTEM

BACKGROUND AND SUMMARY OF THE INVENTION

This application is the U.S. national phase of international application PCT/NO01/00273 filed Jun. 27, 2001 which designated the U.S.

This invention concerns a system for handling baggage in airports. A familiar problem in connection with air travel is that the travellers' baggage is not sorted in due course because of the manual handling not being executed fast enough. Secondly, conventional conveyor belts work at a speed of about 1 m/sec, and the manual handling and sorting tales up too much time. As a consequence there are often delays in connection with the sorting and delivery of baggage to travellers.

A familiar problem for the traveller is baggage that does not reach its destination in due course. This particularly applies for transit baggage and entails great inconvenience for the traveller. In addition, the airlines experience a great deal of extra work and high costs. Any traveller who has reached a destination without his baggage knows how difficult and stressful this may be.

Furthermore, there is a problem with damage to the baggage because of manual handling, in addition to theft and disappearance of baggage.

Present baggage handling systems require a great amount of manual labour and involves tough physical work in that the workers have to make many and heavy lifts. As a consequence of the tough working environment, the number of absence among the workers is high, as is the turnover and the degree of replacements among the staff. The present baggage handling system in use in most of the world's airports is, in other words, a great source of expense for the airlines.

This invention concerns a system for handling baggage in airports where the passenger hands over his baggage at the check-in desk and collects it on arrival at his destination. The system is distinguished in that it includes a check-in area for baggage with means of marking and sorting of the main baggage and the transit baggage, means of transport of the baggage, a buffer for main baggage and a buffer for transit baggage and means of continuous transport of the baggage from the buffers to the airplanes in the departure area.

An important quality of this baggage handling system is that the buffer for the keeping of direct baggage and the buffer for the keeping of transit baggage both transport and store the baggage. Both buffers change identity and destination for a limited amount of time as a result of the various departures. The buffers function as storage rooms for the particular departure, and the baggage is collected and stored in the buffers from the time it has been checked in until just before departure.

Another important quality is that the conveyor belts, the main buffer and the transit buffer are reversible and can transport the baggage in both directions.

In their broad features, the present systems are the same as the ones that were in use in the 1940s, apart from the fact that they have been enlarged owing to a marked increase in the number of travellers and quantity of baggage since then. Poorly constructed and complex baggage handling systems do not offer the travellers optimal service.

Today the travellers give up their baggage at the check-in area. The baggage is marked with a identification tag consisting of a three-letter abbreviation to identify all the world's airports (i.e. airport codes). After check-in, the marked baggage is put on the conveyor belt and is carried to a hall for reloading, where the tag is read manually and the baggage is lifted off the conveyor belt and loaded onto baggage trolleys in a train. Here the first manual reloading of the baggage is done. When the trolleys are full and the passengers who are travelling with that particular flight have checked in, the baggage train is taken to the waiting plane in the airport. Then the second manual reloading is executed, where the baggage trolleys are emptied and the baggage is placed on a sloping conveyor belt and loaded into the hold in the base of the airplane. Regular baggage and transit baggage are loaded together. This system requires a great amount of physically demanding work. There is also the risk of mistakes being done in the reading of the tags, with the consequence that a large quantity of baggage is transported to the wrong airplane and thus the wrong destination.

An average airline company receives from 100,000 up to 130,000 damage statements every year on an average. A damage statement may be the result of baggage that has been sent to the wrong destination, baggage that has disappeared, been delayed, damaged or stolen. The airlines estimate that each of the damage statements amount to NOK 1,000 to 1,500 on an average and this of course results in great expense every year.

The invention under consideration provides a new and simpler system and arrangement for the handling of baggage. The system is capable of eliminating the need for labour in the handling of baggage. As a result, the airlines' expenses in connection with the handling of baggage will no longer apply, as the system will make sure that the baggage is not delayed, sent to the wrong destination, damaged, stolen or lost. All baggage will reach its correct destination in time, intact. This is due to the fact that the system does not require personnel, in that the baggage is transported and stored on a connected conveyor belt, and no manual reloading is done during transit, before the baggage is loaded on board the plane.

A tremendously important feature in the baggage handling system is that all the conveyor belts and all the storage belts are reversible. Another quality of great importance is that the conveyor belts and the storage belts change identity and destination numerous times during the day, depending on the different flights' destination and point of time.

The baggage handling system that the invention consists of is partly based on well-known components, however the composition and the particular way in which they are organised ensures that the invention differ from the systems that are already on the market.

As mentioned above, the average speed on a conventional baggage conveyor belt in use in airports today is about 1 m/s. With the new system the speed can be increased up to about 3 m/s. The system enables the baggage to be loaded on board the airplane before the passengers. This particularly applies for the transit baggage, where delays most commonly occur.

The main reason for this is that in the invention the baggage will be transported on a cohesive conveyor belt from the minute the baggage has been checked in until it has been loaded into the plane. The demanding work of reloading of baggage from the conveyor belts onto transport trolleys and trucks, and then into the hold of the airplanes, has been simplified and rationalised with this new system. All the manual work with reloading of baggage between check-in and loading into the plane is eliminated.

BRIEF DESCRIPTION OF THE DRAWINGS

The invention will, in what follows, be further explained through an illustrations, where.

DETAILED DESCRIPTION OF THE INVENTION

Figure 1:
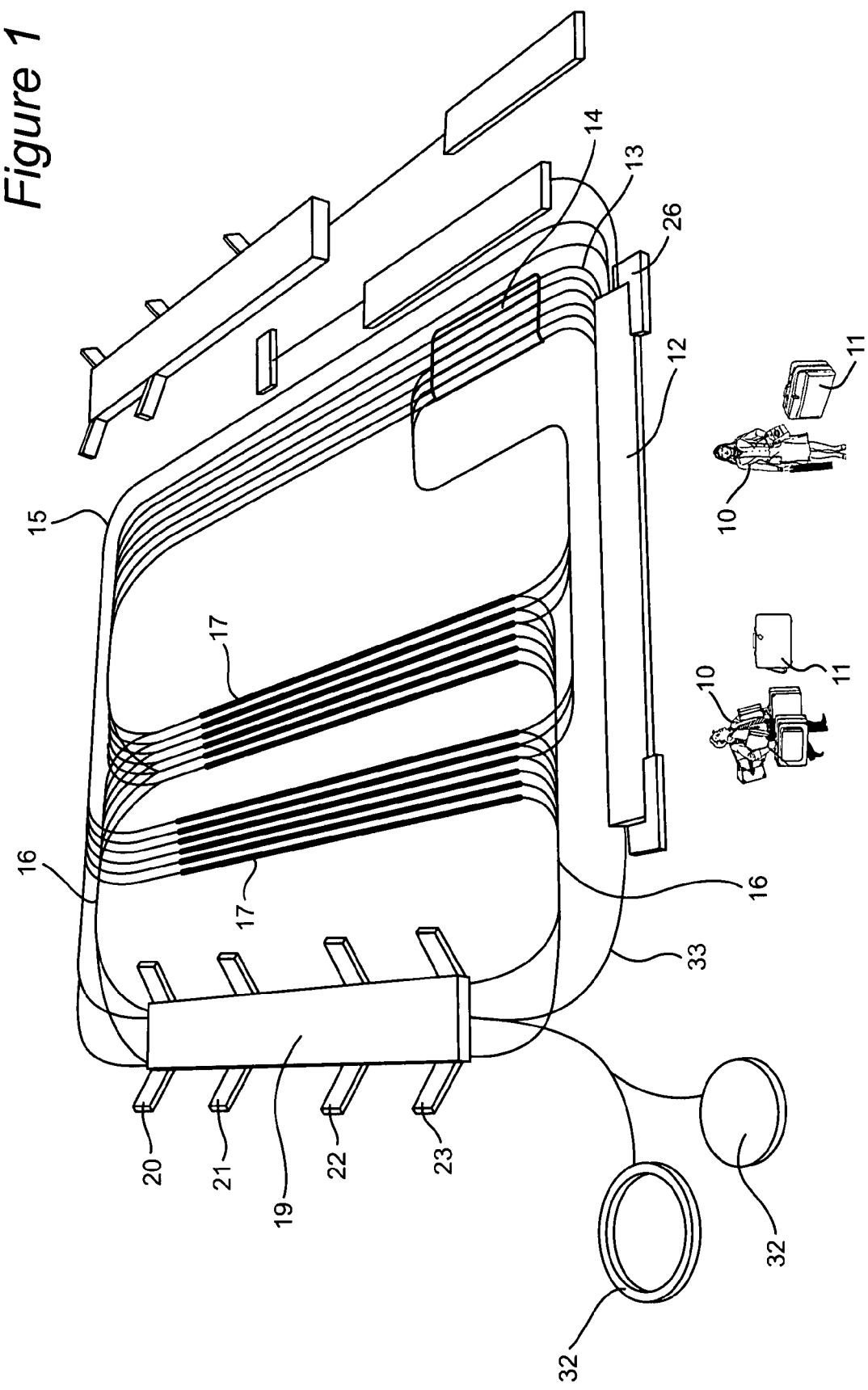
FIG. 1 shows a schematic outline of a baggage handling system embodying the invention.

FIG. 1 indicates in a schematic manner the baggage handling system. The passenger 10 arrives at the airport with his baggage 11. The check-in is done in one of the many check-in desks 12. Here the passenger presents his ticket and receives his boarding card, at the same time as the baggage is weighed and marked with a baggage tag indicating the final destination. Subsequently, the baggage is put onto the conveyor belt 13. If the baggage 11 is going directly to its end destination, it is transported on the connected conveyor belt 13 to an accumulation area, i.e. a buffer 17 for storage of main baggage. This buffer area 17 can consist of a number of parallel conveyor belts. The number of conveyor belts needed depends on the size of the airport and how great part of the baggage which is main baggage, and the proportion between the amount of main baggage and transit baggage. The length of the conveyor belts also varies depending on the amount of baggage. The storage belt 17 can be divided into two or more belts onto which the baggage can be loaded from both sides.

If there is transit baggage that has been checked in, i.e. baggage that needs to be reloaded into another plane after landing, it is transported on belt 13 to a separate buffer 14 for storage of transit baggage. It is of great importance that the transit baggage is kept on a separate transit buffer 14, so that it can be loaded into the plane after the direct baggage has been loaded into the airplane. The reason for this is that the transit baggage can be the first to be removed from the plane after landing, in order to be sorted for the forthcoming departures.

When departure time is approaching and increasing numbers of passengers have checked in their baggage 11, both the buffer 17 for main baggage and buffer 14 for transit baggage are filled up. When all travellers have arrived and checked in, or at another fixed point of time, all the baggage that has been stored in the main baggage buffer 17, is transported onto conveyor belts and all the way out to the airplane at the correct pier 20-23. A short period of time, for instance 5 seconds after the belt with the main baggage has started, the baggage which is stored on the transit buffer 14 is transported on belt 15 and 16 and out to the same airplane. In this manner the transit baggage is loaded into the plane soon after the ordinary baggage, and as a result the transit baggage is the first to be removed after the airplane has landed The invention also opens up for other possibilities. For instance, if desired, the conveyor belt can for example be placed in transporting tunnels or passages under the ground and out to the departure lounge 19 with the different exits 20-23. From these tunnels, the baggage can be transported onto a sloping conveyor belt directly into the storage room of the airplane.

Both buffer 14 and 17 consist of a number of parallel belts that function independently of each other and have varying destinations during the day, since everything is managed by a computer system. These are flexible belts that collect and store baggage in different periods of time and for various destinations depending on when and where the flights are scheduled during the day and night. Computers with specially designed software control the whole baggage handling system.

An important feature in buffer 14 for the storage of transit baggage and in buffer 17 for the storage of main baggage is that they are at a standstill when there is no baggage to load or remove. Baggage 11, which is going to one of the buffers 17 or 14 depending on it being main baggage or transit baggage, will be registered before it draws near the buffers. It can be registered if for example a photocell is crossed and the buffer belts 14,17 are activated. The belts will move until the baggage is loaded, and subsequently the buffer belts 14,17 come to a stop. Thus, the baggage is left with a predetermined space between them on the belt.

The length of the buffer belts must be adapted to the size of the airport and the number of travellers. In order to store large quantities of baggage, the belts on the underside are preferably supported by rollers. These rollers are placed at short intervals of each other and in this way they secure an even distribution of load and even motion of the belts.

In cases of travellers arriving at the airport and checking in plenty of time before their flight departure, the baggage 11 is stored in a special collection buffer 26. The computer system at all times keeps track on the baggage stored in this buffer 26, and the baggage is transported to the proper buffer 17 (for the main baggage) or buffer 14 (for transit baggage) when these buffers have been activated in due time prior to the particular departure.

Passengers who are late and arrive shortly before departure, check in their baggage in the usual manner. The baggage is transported on the belts 13,15,16 directly without entering any buffers.

All the conveyor belts and buffer belts are reversible in accordance with the invention. This signifies that they can run in both directions. The reason is that they give the possibility to transport the baggage the shortest distance from the buffers and out to the airplanes.

All the conveyor belts 13, 15, 16 and the buffer belts 14, 17 are, according to the invention, of the conventional and well-known type. They might consist of conveyor belts which have been connected through conventional passages/conveyor bridges.

In other words, the system in the invention implies a connected line 13, 15, 16 via the buffers 14 or 17 from check-in to the airplane by the departure pier. There is some manual and work demanding reloading of the baggage in this transport chain. The baggage handling system in the invention will, to a great extent, eliminate the problems that occur in connection with delayed baggage and baggage that has been sent to the wrong destination. That is because of the fact that baggage that previously was handled manually in this system is transported automatically, so that the risk of human error is eliminated.

Transportation of special baggage (e.g. rucksacks, prams or other goods with the risk of the baggage getting stuck in the-conveyor belt) can be executed with the special baggage being put in containers. The transportation of this type of baggage can be done in the same manner as for the normal baggage. When the containers have arrived and collected all the baggage from the airplane, the empty containers are stored awaiting employment. The system according to the invention can be used independently of all the baggage being loaded onto containers or if other transport arrangements are used.

The entire baggage system is managed by computer systems that make sure all baggage is led onto the correct belt at the correct time.

With this baggage handling system it is possible to create complete lists of all baggage which has been checked in, in order for the crew to know how much baggage is on board at all times.

When an airplane arrives at the airport the baggage is manually loaded out of the airplane and put on the connected conveyor belt. The transit baggage is the first to be reloaded.

The transit baggage is placed on the conveyor belt 33 in the arrival hall and then taken past the check-in desk 12 and further with belt 13 to the main buffer 17 or transit buffer 14. The remaining baggage in the airplane that has just landed is transported by a conveyor belt in the arrival hall, where the passengers pick up their baggage at the baggage collection point 32.

The invention claimed is:

1. System for the handling of baggage for use in airports, where the passenger hands over his baggage on check-in, and receives it on arrival at the final destination, the system comprising: a check-in area for baggage with means for the marking and sorting of main baggage scheduled for a single flight and transit baggage scheduled for multiple flights, at least one buffer for main baggage and at least one buffer for transit baggage, conveyor means for transporting said main baggage to said main baggage buffer and for transporting said transit baggage to said transit baggage buffer and means for the continuous transport of baggage from said main baggage and transit baggage buffers into a cargo compartment in respective airplanes located in the departure area.

2. The baggage handling system according to claim 1, wherein the means for continuous transport of baggage is a conveyor belt assembly.

3. The baggage handling system according to claim 1, wherein the buffer for main baggage comprises several parallel conveyor belts.

4. The baggage handling system according to claim 1, wherein the buffer for transit baggage comprises several parallel conveyor belts.

5. The baggage handling system according to claim 1 wherein when the airplane is ready for loading, the main buffer is first activated so that the main baggage is transported onto the plane, then the transit buffer is activated so that the transit baggage is loaded into the plane last after the loading of all the main baggage is concluded.

6. The baggage handling system according to claim 1, wherein the main buffer and transit buffer include storage rooms for baggage that change identity and destination in a time limited period as a consequence of the different flight departures.

7. The baggage handling system according to claim 1, wherein the conveyor means, main buffer and transit buffer are reversible and can transport baggage in both directions.

8. Process for transport of baggage in airports prior to departure, wherein the baggage is transported on a continuous belt conveyor system between a check-in area and a cargo compartment of the airplane.

* * * * *